R. K. TAYLOR.
LINER FOR PNEUMATIC TIRES.
APPLICATION FILED OCT. 29, 1912.

1,068,022.

Patented July 22, 1913.

Witnesses
Chas. W. Stauffiger
Anna M. Dorr.

Inventor
Robert K. Taylor,
By
Attorneys

UNITED STATES PATENT OFFICE.

ROBERT K. TAYLOR, OF DETROIT, MICHIGAN, ASSIGNOR, BY DIRECT AND MESNE ASSIGNMENTS, TO GILBERT S. FIELD, OF DETROIT, MICHIGAN.

LINER FOR PNEUMATIC TIRES.

1,068,022.  Specification of Letters Patent. Patented July 22, 1913.

Application filed October 29, 1912. Serial No. 728,473.

*To all whom it may concern:*

Be it known that I, ROBERT K. TAYLOR, a citizen of the United States of America, residing at Detroit, in the county of Wayne and State of Michigan, have invented certain new and useful Improvements in Liners for Pneumatic Tires, of which the following is a specification, reference being had therein to the accompanying drawings.

This invention relates to a liner for pneumatic tires whereby the latter are rendered substantially proof against puncture and whereby the deleterious effect of heating from the friction between the inner tube and the outer casing is eliminated to a large extent as well as the softening of the inner tube that may occur from running over a road bed at high speed.

The invention consists in the matters hereinafter set forth and pointed out in the claim.

Figure 1:
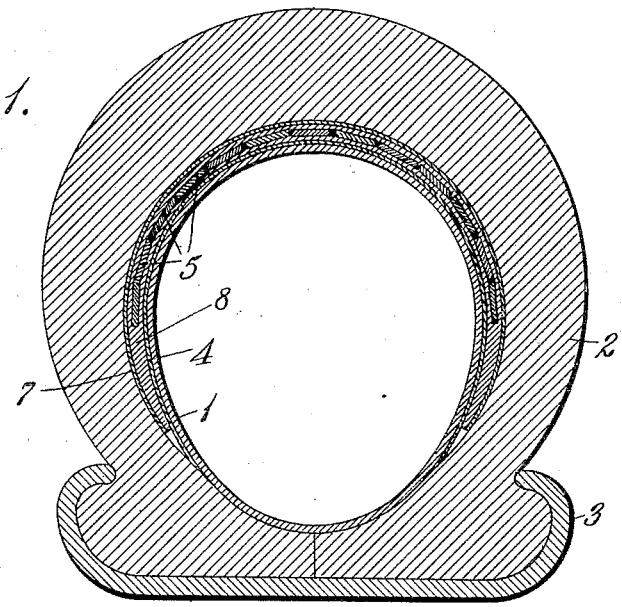
Figure 2:
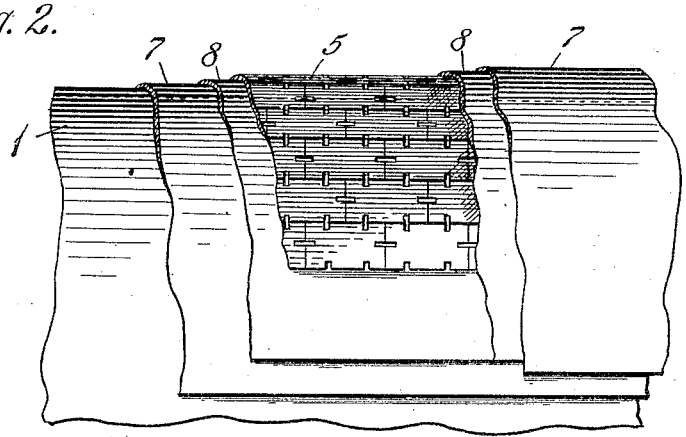
Figure 3:
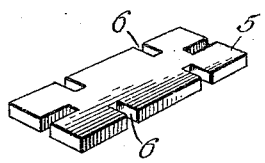

In the drawings, Figure 1 is a view in section through a tire that is equipped with a liner that embodies features of the invention; Fig. 2 is a fragmentary view in detail showing a portion of the tire and liner, parts being broken away to give clear view; and Fig. 3 is a view in detail of a lining plate.

Referring to the drawings an inner tube 1 is inclosed with a casing 2 adapted to be mounted in a rim 3 in any conventional and standard manner. A liner is interposed between the inner tube and casing and in such manner as to partially envelop the outer or tread portion of the tube. This is built up of superposed layers of woven fabric and rubber gum or the like with plates embedded in the gum between the fabric sheets, the whole being vulcanized to form a substantially integral annular sheath. In order to obtain the form most desirable, this liner is built up around a mandrel that has the same diameter and cross section as that of the inner tube for which the liner is adapted. An inner sheet 4 of woven material or other suitable flexible fabric is formed around the mandrel and a sheet of rubber or the like applied thereto. A plurality of plates 5, of fiber or like substance adapted to form a good heat insulating body, are arranged in regular series and in staggered relation to each other on the rubber sheet. These plates have slots 6 or notches in their margins, the slots or notches of adjoining plates being in register when the latter are assembled whereby openings are formed through the meeting margins of the plates. An outer layer of rubber gum is then placed over the applied plates together with a sheathing 7 of woven fabric or like suitable material and the whole structure is then vulcanized so that it forms a substantially integral liner with a central layer 8 of rubber in which the plates 5 are contained, the rubber passing through the slots, apertures or notches of the plates and forming tenons which lock the plates against displacement in any direction and prevent the edges of contiguous plates from slipping past each other so that the plates cannot at any time move into overlapping relation. As the liner is molded in the manner described it readily conforms to the exterior of an inner tube and to the interior of the outer casing, and when applied in the manner indicated, prevents any puncture of the tire and any deleterious effect on the inner tube from heating whether the latter be caused by gripping or working of the casing on the tube locally or from heat communicated through the casing from the road-way.

Obviously, changes in the details of construction may be made without departing from the spirit of my invention and I do not care to limit myself to any particular form or arrangement of parts.

What I claim is:—

A lining for a pneumatic tire consisting of an inner sheet of pliable fabric formed to the contour of a tire tube to seat thereon, a correspondingly formed outer sheet of pliable material, a series of plates with mating indentations in their meeting margins that form openings through the plates, the plates lying in abutting and staggered relation, and a body of rubber that envelops the plates and passes through openings therethrough, the rubber being vulcanized to the inner and outer sheets.

In testimony whereof I affix my signature in presence of two witnesses.

ROBERT K. TAYLOR.

Witnesses:
ANNA M. DORR,
CHAS. W. STAUFFIGER.

---

Copies of this patent may be obtained for five cents each, by addressing the "Commissioner of Patents, Washington, D. C."